Oct. 30, 1934.  H. PAXTON  1,978,503
METHOD OF AND APPARATUS FOR APPLYING COVERS
TO CROWN PACKED SHIPPING CASES
Filed Oct. 3, 1931  3 Sheets-Sheet 1
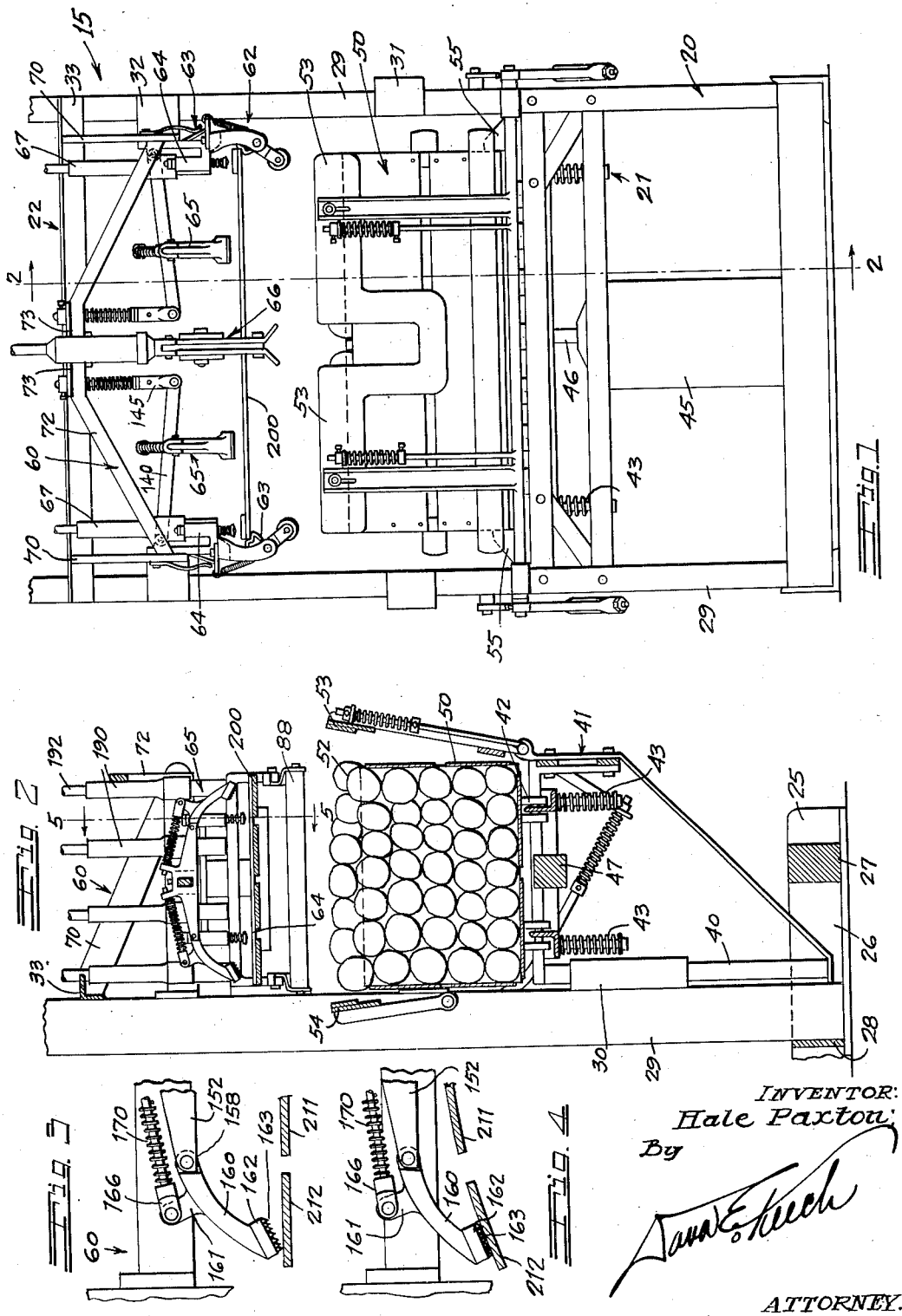
INVENTOR:
Hale Paxton
By
ATTORNEY.

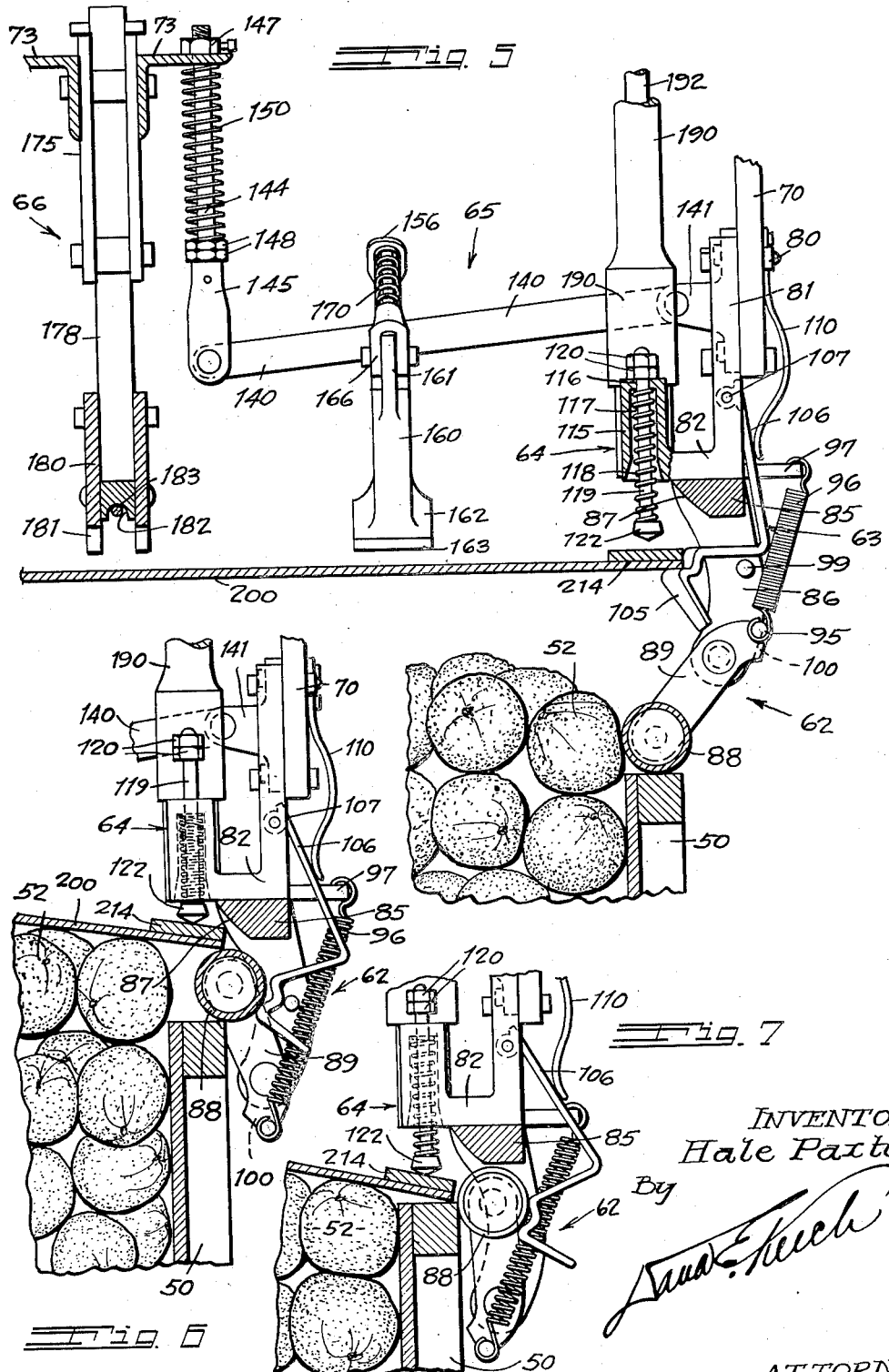

Oct. 30, 1934.  H. PAXTON  1,978,503
METHOD OF AND APPARATUS FOR APPLYING COVERS
TO CROWN PACKED SHIPPING CASES
Filed Oct. 3, 1931  3 Sheets-Sheet 3
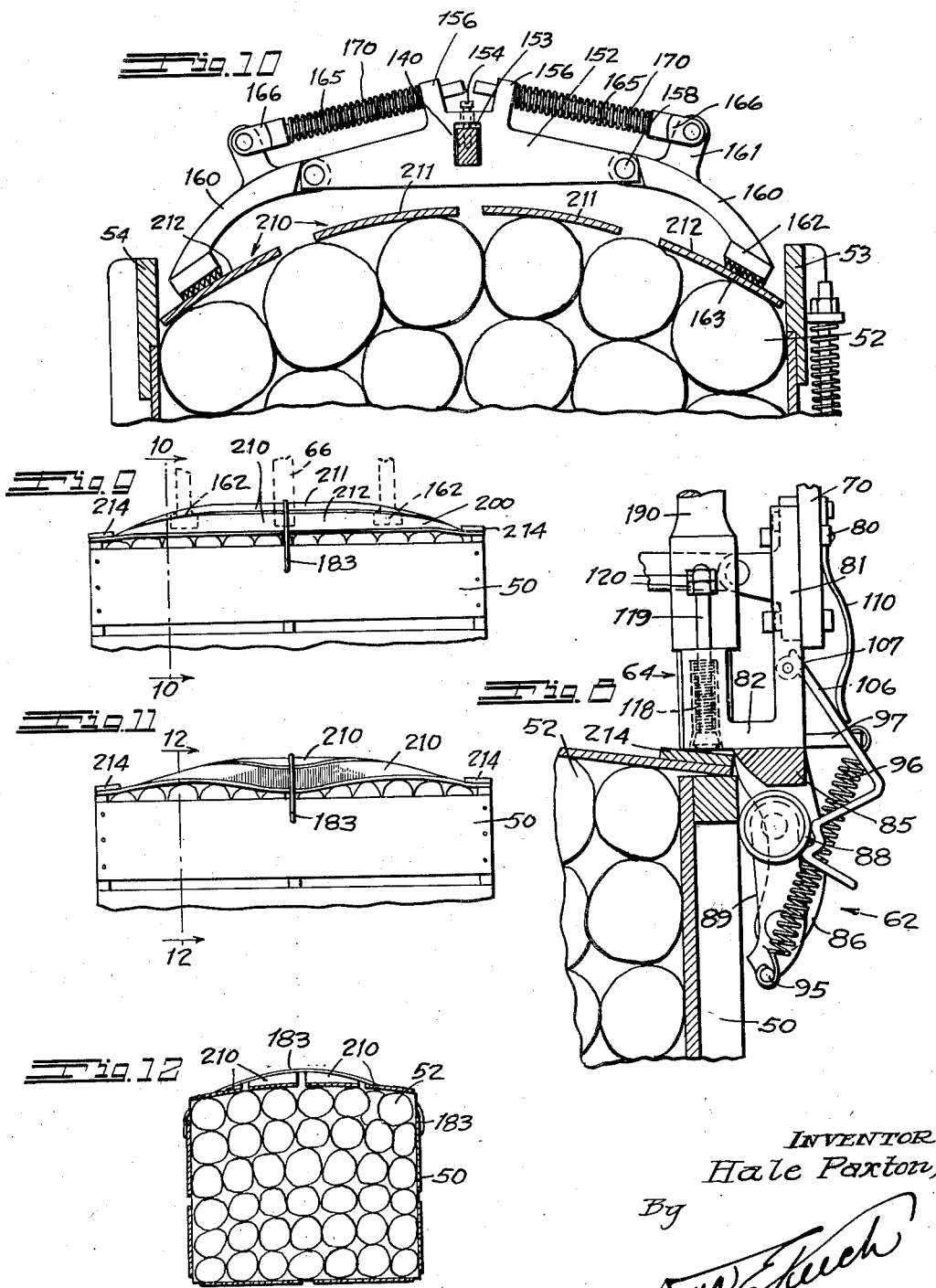
INVENTOR:
Hale Paxton;
By
ATTORNEY.

Patented Oct. 30, 1934

1,978,503

UNITED STATES PATENT OFFICE 1,978,503

METHOD OF AND APPARATUS FOR APPLYING COVERS TO CROWN PACKED SHIPPING CASES

Hale Paxton, Redlands, Calif., assignor to Paxton Credit Corporation, Sanger, Calif., a corporation of California Application October 3, 1931, Serial No. 566,822

16 Claims. (Cl. 1—10)

My invention relates to the art of packaging produce for shipment and more particularly to methods and apparatus utilized in applying covers to crown packed shipping cases.

Many farm products, and particularly fresh fruits and vegetables, are shipped to market in wooden shipping cases, commonly called crates or boxes. It is customary to pack these cases full of produce until a considerable portion thereof overlies the top of the box. When the lid is then applied to the case the ends of the lid alone are brought in contact with the case and nailed thereto, the middle portion of the lid being bowed upwardly by the bulging produce in the case. This is called a crown pack.

In putting up crown packs of various products and particularly citrus fruits, it is customary at the present time to use multi-slat covers and to tuck the produce in over the sides of the box as the cover is being pressed downwardly thereon, this of course being done to prevent the cover pressing the side upper layers of fruit against the upper edges of the box sides so as to damage the fruit. After the box is lidded, however, the lid exerts a relatively heavy pressure against the upper side rows of fruit near the ends of the box but leaves those portions of the rows near the middle of the box fairly loose and able to shake around and become damaged.

It is an object of my invention to provide a method of and apparatus for applying covers to crown packed shipping cases which, by the manipulation of the cover places the upper side rows of fruit under comparatively uniform pressure throughout their length.

In putting up crown packs of citrus fruits it is the present practice to apply a strap transversely of the cover after this has been secured to the box and secure opposite ends of this strap to the sides of the box. This strap bows the sides of the cover downwardly at its middle, but permits the side edges of the cover between its middle and ends to bow upwardly. This manner of strapping, therefore, fails to bring about an application of uniform pressures to the pieces of fruit in the upper side rows in the box.

It is another object of my invention to provide a method of and apparatus for applying covers to crown packed shipping cases and by which the cover will be so manipulated prior to the application of the strap that when the strap is applied the cover will be maintained in such a position that substantially uniform pressures will be applied thereby to the upper side rows of fruit in the box.

The crown pack of citrus fruits put up according to the common practice above described is not a neat package, yet attractiveness in the package is a considerable factor in the selling of anything.

It is yet another object of my invention to provide a method of and apparatus for applying covers to crown packed shipping cases by which a crown pack of improved appearance may be put up.

In pressing covers on shipping cases crown packed with farm produce it is frequently necessary to tuck the produce in at the ends of the case between the case and the cover. Ordinarily a certain amount of time elapses after these tuckers are withdrawn and before the ends of the cover are brought into contact with the ends of the case so that these may be secured thereto. During this interval the produce tends to move back between the ends of the cover and the case so as to be pinched therebetween when these ends are finally brought together.

It is an object of my invention to provide a method of and apparatus for applying covers to crown packed shipping cases in which the interval of time between the withdrawing of the tucker and the depression of the lid against the end of the case is reduced to a minimum.

Further objects and advantages will be made apparent in the following description and in the accompanying drawings, in which:

Fig. 1 is a front elevational view of a preferred embodiment of the apparatus of my invention.

Fig. 2 is a transverse sectional view taken on the line 2—2 of Fig. 1.

Figs. 3 and 4 are diagrammatic fragmentary enlarged sectional views taken in the same plane as Fig. 2 and illustrating the operation of my apparatus in spreading slats of a cover.

Fig. 5 is an enlarged diagrammatic fragmentary view of a right hand upper portion of Fig. 1, parts thereof being broken away to illustrate their construction.

Figs. 6, 7 and 8 are views similar to Fig. 5 and unite with that figure in showing the operation of the lid end deflecting means of my invention.

Fig. 9 is a fragmentary side elevational view of the upper portion of a citrus shipping case just as the lidding and strapping of this case is being completed according to the method and by the apparatus of my invention.

Fig. 10 is an enlarged diagrammatic cross sectional view taken on the line 10—10 of Fig. 9, and showing how the side slats of a multi-slat cover are spread and shaped downwardly by my invention.

Fig. 11 is a view similar to Fig. 9 but illustrating the appearance of the upper side of a citrus fruit shipping case after this has been lidded and strapped by the method in common use prior to my invention.

Fig. 12 is a cross sectional view taken on the line 12—12 of Fig. 11.

Although the method of my invention is adapted to be performed by hand or by any suitable apparatus provided for accomplishing this, I have shown in the drawings an apparatus 15, in the form of a box lidder and strapper, which is especially well adapted for performing this method.

The combined lidder and strapper 15 includes a frame 20 having a box elevator 21 thereon and a cover manipulating and securing means 22 also provided on the frame 20 above the elevator 21.

The frame 20 includes a base 25 having feet 26 connected by cross bars 27 and 28. Secured to the feet 26 and extending upwardly therefrom are standards 29 having slideways 30, box guides 31, lugs 32, and a cross bar 33 rigidly secured thereto as by welding.

As the elevator 21 in the apparatus 15 is substantially the same as the elevator of the apparatus shown in my copending application Ser. No. 501,285, filed December 10, 1930, the details of this elevator are not completely shown herein. However, this elevator has slide bars 40 slidably disposed in the slideways 30 and upon which is constructed a frame 41, this frame supporting a box conveyer 42 through springs 43. The elevator 21 also has a hydraulic cylinder 45 the piston 46 of which is connected to a longitudinal bar 47 of the frame 41 so as to lift this upwardly when liquid is supplied under pressure to the cylinder 45 by a suitable hydraulic pump (not shown).

The conveyer 42 is adapted to support a shipping case 50 which is illustrated in the drawings as crown packed with citrus fruit. That is, the fruit is so packed in the case 50 that the upper portion of the fruit overlies the top of the box. This upper portion of the fruit will hereinafter be referred to as the crown fruit 52. Diagrammatically shown in the drawings are front and rear side flushers 53 and 54 which are mounted upon the elevator frame 41 and actuated by suitable means attached to the main frame 20 in the manner clearly shown in my aforementioned copending application Ser. No. 501,285. That is, when the elevator 21 lifts the box 50 the flushers 53 and 54 are automatically swung inward to flush in the side portions of the crown fruit 52.

The elevator 21 also may preferably be provided with automatic box stops 55 which permit a shipping case 50 to be rolled onto the conveyer 42 and then automatically trap this case in the proper position in the machine 15 for lidding it. The stops 55 are preferably of the type shown in my copending application Ser. No. 468,680, filed July 17, 1930.

The cover manipulating and securing means 22 includes a skeleton 60 upon which are supported end fruit tuckers 62, yieldable cover supports 63, yieldable cover depressors 64, yieldable cover spreaders and shapers 65, a yieldable cover shaper and strapper 66, and nailing means 67 for nailing the ends of a cover to ends of the shipping case 50.

The skeleton 60 (Fig. 2) includes brackets 70 which are mounted upon the lugs 32 and the angle iron cross bar 33, and extend forwardly as clearly shown in Fig. 2. Connecting the forward ends of the brackets 70 is a cross member 72 which extends upwardly at its center to the level of the frame member 33 and is connected to this by angle iron members 73.

Secured to the bracket 70 as by bolts 80 (Figs. 5 and 8) are supporting legs 81 having feet 82 formed on the lower ends thereof. Rigidly secured to lower faces of the feet 82 are cover guiding bars 85 which are provided at their opposite ends with downwardly extending arms 86. Each of the cover guiding bars 85 has a cover contacting face 87.

The end tuckers 62 may be of any suitable type but are preferably of the kind disclosed in my copending application for U. S. Patent, Ser. No. 515,509, filed February 13, 1931. Each of the end tuckers 62 includes a roller 88 pivotally mounted between levers 89 which are pivotally secured to lower ends of the arms 86. On opposite ends of the levers 89 from the roller 88 are provided pins 95 each of which is connected by a suitable contractile spring 96 to a bar 97 suitably secured to an upper face of the cover guide bar 85 disposed thereabove. Provided on the arms 86 and extending inwardly therefrom are pins 99 which are adapted to limit upward swinging movement of the roller 88. Provided on outer ends of the levers 89 are stops 100 which bear against the arms 86 and limit the downward movement of the tuckers 62.

Each of the yieldable cover supports 63 comprises a latch 105 mounted on an arm 106, this being fixed upon a shaft 107 which is pivotally supported between a pair of the legs 81. Secured on outer faces of the brackets 70 are leaf springs 110 which bear against the arms 106 and maintain the yieldable cover supports 63 normally in inward position.

The yieldable cover depressors 64 are equal in number to the legs 81 and each includes a body 115 formed on the inner end of one of the feet 82, this body having an aperture 116 formed therein which is counter bored at 117 to receive a compression spring 118, which is held in the counter bore by a bolt 119 which extends upwardly through the spring and the aperture 116 and has lock nuts 120 screwed on its upper end. The bolt 119 has a head 122 which is preferably formed as shown in Fig. 5 and is normally maintained in a depressed position as shown in this figure below the cover guide bar 85.

The yieldable cover spreaders and shapers 65 (Figs. 1 and 5) are provided in duplicate at each end of the machine, each of these including a pressure bar 140 which is pivotally supported at its outer end on a bracket 141 secured to the inner face of one of the skeleton brackets 70, and at the other end is pivotally supported by a clevis 145 provided on the lower end of a threaded slide rod 144 which extends upwardly through a suitable opening in the horizontal flange of the angle iron 73 on that side of the machine and has a collar 147 secured thereon to limit the downward movement of this rod. The rod 144 has a pair of lock nuts 148 screwed down thereon against the clevis 145 and disposed between the angle iron 73 and the nuts 148 is a coil compression spring 150, the tension of which may be adjusted by the nuts 148 and which exerts a downward pressure on the rod 144.

Supported on the pressure bar 140 of each yieldable cover spreader and shaper 65 is a pressure yoke 152 (Figs. 1, 4, and 10) having a central opening 153 through which the bar 140 extends loosely, the yoke 152 being loosely held against longitudinal movement on the bar 140 by a screw 154. The yoke 152 has ears 156 which extend upwardly therefrom near the middle of the yoke as clearly shown in Fig. 10. Connected to opposite ends of the yoke 152 by knuckle joints 158 are jaw arms 160 having lugs 161 formed upwardly therefrom and provided with jaws 162 having teeth 163. The knuckle joints 158 are such as to limit the downward swinging movement of the arms 160 relative to the yoke 152. Extending through suitable holes in the ears 156 are rods 165 the opposite ends of which are provided with clevises 166 which pivotally connect with upper ends of the lugs 161. Coiled about each rod 165 between the adjacent ear 156 and clevis 166 is a compression spring 170, these springs maintaining the arms 160 in downward position except when subjected to a substantial upward pressure.

The yieldable cover shaper and strapper 66 may be of any suitable design but is shown herein as preferably consisting of a strapper such as is disclosed in my copending application for U. S. Letters Patent filed July 31, 1931, Ser. No. 554,211. The strapper 66 (Figs. 1 and 5) has a body 175 which is rigidly secured in place on the skeleton 60 by bolts which pass through the body 175 and the angle irons 73. Slidable vertically in the body 175 is a bar 178 from the lower end of which is suspended a saddle bar 180 this being provided with means for yieldingly holding it in a downward position for a reason which will be made manifest hereinafter. The saddle bar 180 has end portions 181 which extend downwardly and the bar 180 is provided along its lower face with a strap shaping recess 182 in which a strap 183 is adapted to be shaped as indicated in Fig. 5, and as clearly disclosed in my aforementioned application Ser. No. 554,211.

The nailing means 67 provides a plurality of nail guiding chucks 190 which are supported in any preferred manner on inner faces of the brackets 70 with lower faces of these chucks disposed substantially on the same level as the upper face of the cover guide bar 85 adjacent thereto. The chucks 190 are provided with hammers 192 which are all connected to a suitable driving mechanism (not shown) the operation of which reciprocates these hammers vertically so as to drive nails downwardly from the chucks 190 in a manner and for a purpose which will become manifest hereinafter.

The method of my invention is adapted to be carried out by the operation of the apparatus 15 in the following manner:

A box 50 is rolled onto the conveyer 42 when the various elements of the combined lidder and strapper 15 are positioned as shown in Figs. 1 and 2. This results in the stop 55 automatically positioning the case 50 properly for being lidded and strapped by the machine 15. A strap is now fed upwardly into the yieldable cover shaper and strapper 66 and a cover 200 is slid into position between the opposite cover supports 63 as shown in Figs. 1 and 2. The power mechanism (not shown) of the machine 15 is now actuated so as to feed liquid under pressure to the cylinder 45 and cause the elevator 42 to be lifted upward. As before mentioned, this brings the flushers 53 and 54 inward to tuck side portions of the crown fruit 52 over side edges of the case 50.

It is now to be noted that the jaws 162, when in position of rest, as shown in Fig. 5, are disposed at approximately the same level as the downwardly extending end portions 181 of the saddle bar 180 which are fairly close to the cover 200. As the case 50 is lifted by the elevator 21, the crown fruit 52 comes into contact with the cover 200 and lifts it upwardly into contact with the saddle bar 180 and jaws 162.

The covers 200 which are adapted to be used in the performing of my method preferably consist of a plurality of slats 210, these for convenience being designated as inner slats 211 and outer slats 212. In each cover 200 the slats are connected at their ends by cleats 214.

As the lifting of the elevator 21 continues after contact of the cover 200 with the strapper 66 and the spreaders and shapers 65, the teeth 163 of the jaws 162 resist this movement and engage with the cover slats 212 so as to flex these laterally and downwardly as shown in Fig. 10. The vertical pressure upwardly against the spreaders and shapers 65 compresses the springs 150 somewhat and rocks the arms 160 about the knuckle joints 158 so as to compress the springs 170 as shown in Fig. 10.

By virtue of the angle at which the jaws 162 meet the slats 212 and the fact that the teeth 163 are somewhat imbedded in these slats when these force the arms 160 to swing upwardly, the slats 212 are not only forced downwardly at an angle so as to arch the lid 200 transversely, but they are spread outwardly toward the sides of the case 50. The slats 212 of course cannot be spread at their ends where they are attached to the cleats 214. Thus the spreading of the slats 212 at the points where jaws 162 are located results in outer edges of the slats 212 being placed under such tension as to tend to maintain the slats in the transversely shaped condition in which they are shown in Figs. 9 and 10.

As shown in Fig. 10 the spreading of the slats 212 and shaping of the cover 210 takes place while the flushers 53 and 54 are flushing the crown fruit 52 in over the sides of the case 50. Spreading of the slats 212 and shaping these downwardly therefore, bring these over side edge rows of the crown fruit 52 and presses this down into the case so as not only to protect the fruit, but by virtue of the tautness of the outer edges of the slats 212, apply a substantially uniform pressure to the edge rows of crown fruit while the case 50 is on its way to market. It is also evident by comparison of Figs. 9 and 11 that the substantially uniform depression of the outer edges of the side slats 212 forms a much more attractive and neat package than the old method of lidding and strapping a shipping case as shown in Fig. 11.

The amount of pressure exerted by the jaws 162 against the slats 212 to shape these as above described may be adjusted by manipulation of the lock nuts 148 on the clevis rod 144 shown in Fig. 5. It is also clear that whenever the jaws 162 are not contacted by a cover, the arms 160 are rocked downwardly by springs 170 to the limit of the knuckle joints 158 as shown in Fig. 2. Attention is also called to the fact that the yoke 152 is loosely mounted on the pressure bar 140 so as to allow a limited degree of freedom to the yoke 152 for adjustment to various covers and insure that the pressure applied to the covers by the two jaws 162 is substantially uniform. It is also noted that a number of threaded holes for receiving the screws 154 are provided in the bars 140 to permit longitudinal adjustment of the yokes 152 thereon.

By virtue of the fact that it is disposed at substantially the same level as the jaws 162, the saddle bar 180 of the yieldable cover shaper and strapper 66, cooperates with the spreader and shaper 65 to shape the cover 200 transversely. As shown in Fig. 9, the cover 200 is shaped at its middle by the strapper 66. In case it is desired to strap the cover 200 to the case 50 a strap 183 is inserted in the strapper before the lidding operation commences. If it is not desired to strap the cover to the case, the lidding operation is merely performed with the strapper empty. In this event the cover 200 is shaped at three points between its ends, and, owing to the outer slats 212 being spread by the jaws 162, the cover 200 substantially maintains its transversely arched shape as shown in Fig. 10, while on the way to market.

The strapping of each cover 200 after it has been applied and spread or while it is being applied and spread, as hereinbefore described, has distinct advantages, of course, in that it positively retains the slats 210 of the cover 200 in their spread position and acts as a reinforcement to the cover.

Referring now to Figs. 5, 6, 7 and 8 it is noted that the end tucker rollers 88 swing inwardly as the case 50 is elevated from the position in which it is shown in Fig. 5 to that in which it is shown in Fig. 6, and then swing outwardly between the end of the case and the end of the cover 200. When the rollers 88 are thus withdrawn, the end crown fruit 52 which they tuck inwardly in their endwardmost position, tend to return outwardly between the box ends and the ends of the cover. It is noted in Fig. 6, however, that when the crown fruit 52 engages the cover 200 so as to lift this upwardly the cover end cleats 214 engage the bolt heads 122 of the yieldable cover depressors 64 so as to compress the springs 118. These springs are of sufficient strength so that when the tuckers 62 are entirely withdrawn from beneath the cover 200 the cover depressors 64 force the ends of this cover downwardly practically immediately against the ends of the case 50. This action of the cover depressors 64 prevents end portions of the crown fruit 52 from becoming pinched between the time that the tuckers 62 are withdrawn from between the case and the cover, and the time that the ends of the cover are pressed against the case ends by the case being lifted up to force the cleats 214 against the nail chucks 190. When the cleats 214 are thus forced upwardly, the cover depressing springs 118 are compressed as shown in Fig. 8. This is accomplished simultaneously with the shaping of the cover 200 and the spreading of the slats thereof as hereinabove described.

The hammers 192 are now power actuated to nail the ends of the cover 200 to the ends of the case 50 and in case a strap has been inserted into the strapper 66 the ends of this are driven into the sides of the case 50 simultaneously with the nailing of the ends of the cover to the case as disclosed in my copending application Ser. No. 554,211. The case is now lidded and strapped as shown in Fig. 9 and the method of my invention has been completely performed thereon.

What I claim is:

1. A method of applying covers to shipping cases crown packed with fresh farm produce, which consists in positioning a cover over a crown packed case, bringing said case and said cover pressurably together, said pressure being applied to said cover at its ends and also intermediate its ends at spaced points longitudinally, the pressure at said spaced points arching said cover transversely, and securing the ends of said cover to the ends of said case while said cover is thus shaped.

2. A method of applying covers to shipping cases crown packed with fresh farm produce, which consists in positioning a multi-slat cover over a crown packed case, bringing said case and said cover pressurably together, said pressure being applied to said cover to spread the slats thereof laterally, and securing the ends of said cover to the ends of said case while said slats are thus spread.

3. A method of applying covers to shipping cases crown packed with fresh farm produce, which consists in positioning a multi-slat cover over a crown packed case, flushing overlying produce inward over upper edges of case sides, bringing said case and said cover pressurably together so as to spread the side edge slats of said cover laterally during said flushing, and securing the ends of said cover to the ends of said case.

4. A method of applying covers to shipping cases crown packed with fresh farm produce, which consists in positioning a multi-slat cover over a crown packed case, flushing overlying portions of said produce inwardly over upper edges of the sides of said case, bringing said case and said cover pressurably together, said pressure being applied to said cover to bring the ends thereof against the ends of said case and to spread the side slats of said cover laterally and depress these to give a transverse arched effect to said cover, and securing said cover to said case.

5. A method of applying covers to shipping cases crown packed with fresh farm produce, which consists in positioning a multi-slat cover over a crown packed case, bringing said case and said cover pressurably together, said pressure being applied to said cover at its ends to bring said ends against the ends of said case, and to said cover intermediate its ends to spread the side slats of said cover laterally, securing the ends of said cover to said case, and strapping said lid transversely to said case to help maintain said side slats in spread position.

6. In combination: means for applying a cover to a crown packed case; and means to spread said cover laterally in the course of being applied.

7. In combination: means for applying a multi-slat cover to a shipping case crown packed with farm produce; means for tucking overlying portions of said produce between said case and said cover while said cover is being applied; and means for spreading said cover laterally in the course of being applied.

8. In combination: means for applying a multi-slat cover to a shipping case crown packed with farm produce; means for tucking overlying portions of said produce between said case and said cover while said cover is being applied; and means for spreading said cover laterally as it is being applied and depressing the side edges of said cover to substantially the same level throughout their length.

9. In combination: means for applying a multi-slat cover to a shipping case crown packed with farm produce; and means for spreading said cover laterally as it is being applied and depressing the side edges of said cover to substantially the same level throughout their length.

10. In combination: means for applying a multi-slat cover to a shipping case crown packed with farm produce; means for spreading said cover laterally as it is being applied and depressing the side edges of said cover to substantially the same level throughout their length; and means for thereafter securing the ends of said cover to the ends of said case as thus applied and shaped laterally.

11. In combination: means for applying a cover to a shipping case crown packed with fresh farm produce; means automatically moving inwardly between an end edge of said case and an end edge of said cover for tucking an overlying portion of said produce inward between said end edges, said means being automatically withdrawn just in time to avoid its obstructing the application of said cover to said case; and automatically operative means for relatively quickly pressing said cover ends towards the ends of said case immediately following said withdrawal.

12. In combination: means for applying a cover to a shipping case crown packed with farm produce; means extending between said case and said cover to tuck said produce inward from between edges of said cover and said case; means yieldably pressing the edges of said cover against said tucker means so as to immediately depress said cover relative to said case when said tucking means is withdrawn; and means for securing said cover to said case to retain said cover edges depressed as aforestated.

13. In a press for lidding boxes overfilled with fresh fruit or vegetables so that an upper layer of the latter extends above the box and overflows vertical walls thereof, the combination of: a box supporting table; an overhead structure having lid end engaging faces; means causing relative vertical movement between said table and said structure to press the ends of a lid onto the ends of said box leaving the middle of the lid bulging upwardly to accommodate said upper layer; a pair of jaws; and means for mounting said jaws on said overhead structure so as to be yieldable vertically and to be brought into pressural engagement with the side edge slats of said lid incident to the application of the latter to said box, said mounting means causing said jaws to separate in response to said engagement, thereby spreading said side slats.

14. In a lid press the combination of: a nailing table for supporting a shipping case crown packed with fresh farm produce and with a lid disposed thereover; tuckers for tucking said produce inwardly between the ends of said box and the ends of said lid; means for automatically withdrawing said tuckers from between said box ends and said lid ends during a lid pressing operation; and means yieldably pressing on said lid ends during the withdrawal of said tuckers to maintain said lid ends in contact with said tuckers until the latter are withdrawn from between said box ends and said lid ends.

15. A combination as in claim 14 in which means is provided for bringing said tuckers and yieldable means into conjoint operation and to cause the pressure exerted by said yieldable means on said lid ends to increase substantially during the withdrawal of said tuckers, said pressure causing said yieldable means to quickly press the ends of said cover onto the ends of said box as said tuckers are withdrawn.

16. A combination as in claim 14 in which said tuckers are maintained in contact with upper edges of said box ends during said withdrawal.

HALE PAXTON.